US008205498B2

(12) United States Patent
Hsu et al.

(10) Patent No.: US 8,205,498 B2
(45) Date of Patent: Jun. 26, 2012

(54) MULTI-AXIS CAPACITIVE ACCELEROMETER

(75) Inventors: Yu-Wen Hsu, Tainan (TW); Sheah Chen, Taipei (TW); Hsin-Tang Chien, Yilan County (TW)

(73) Assignee: Industrial Technology Research Institute, Hsinchu (TW)

( * ) Notice: Subject to any disclaimer, the term of this patent is extended or adjusted under 35 U.S.C. 154(b) by 443 days.

(21) Appl. No.: 12/618,791

(22) Filed: Nov. 16, 2009

(65) Prior Publication Data

US 2010/0122579 A1 May 20, 2010

Related U.S. Application Data

(60) Provisional application No. 61/115,546, filed on Nov. 18, 2008.

(30) Foreign Application Priority Data

Dec. 15, 2008 (TW) ................................ 97148843 A
Dec. 26, 2008 (TW) ................................ 97151113 A (51) Int. Cl.
*G01P 15/125* (2006.01)
(52) U.S. Cl. .................................. 73/514.32; 73/514.38
(58) Field of Classification Search ............... 73/514.32, 73/488, 504.12, 510, 514.01, 514.24, 514.29, 73/514.38
See application file for complete search history.

(56) References Cited

U.S. PATENT DOCUMENTS

| 5,487,305 A * | 1/1996 | Ristic et al. ................. 73/514.32 |
| 5,756,901 A * | 5/1998 | Kurle et al. ..................... 73/777 |
| 5,777,227 A * | 7/1998 | Cho et al. .................... 73/514.38 |
| 5,817,942 A * | 10/1998 | Greiff ......................... 73/514.01 |
| 5,900,550 A * | 5/1999 | Menzel ....................... 73/514.32 |
| 6,018,998 A * | 2/2000 | Zunino et al. .............. 73/514.16 |
| 6,041,653 A * | 3/2000 | Ichikawa et al. ........... 73/514.32 |
| 6,128,956 A * | 10/2000 | Foote .......................... 73/514.29 |
| 6,149,190 A * | 11/2000 | Galvin et al. .................. 280/735 |
| 6,201,284 B1 * | 3/2001 | Hirata et al. ................... 257/415 |
| 6,223,598 B1 * | 5/2001 | Judy ........................... 73/514.32 |
| 6,250,156 B1 * | 6/2001 | Seshia et al. ................ 73/504.12 |
| 6,257,059 B1 * | 7/2001 | Weinberg et al. ........... 73/504.16 |
| 6,845,670 B1 | 1/2005 | McNeil et al. |
| 6,964,195 B2 * | 11/2005 | Hobbs et al. ............... 73/504.14 |
| 6,981,416 B2 * | 1/2006 | Chen et al. ...................... 73/510 |
| 7,172,919 B2 * | 2/2007 | Weinberg et al. ............... 438/50 |
| 7,258,011 B2 | 8/2007 | Nasiri et al. |
| 7,258,012 B2 | 8/2007 | Xie |
| 7,784,344 B2 * | 8/2010 | Pavelescu et al. .......... 73/514.32 |
| 7,796,872 B2 * | 9/2010 | Sachs et al. ..................... 396/55 |
| 7,849,742 B2 * | 12/2010 | Wang et al. ................. 73/514.32 |

(Continued)

*Primary Examiner* — Hezron E Williams
*Assistant Examiner* — Samir M Shah
(74) *Attorney, Agent, or Firm* — Jianq Chyun IP Office (57) ABSTRACT

A multi-axis accelerometer is consisted of a substrate with sensing electrodes and a structure layer. The structure layer includes anchor bases fixed on the substrate. A first proof mass is disposed over the substrate and has a first opening and a second opening symmetric to each other. The first proof mass is suspended to the anchor bases. Fixed sensing blocks are disposed on the substrate, and capacitors are formed between each fixed sensing block and the first proof mass for sensing acceleration along two in-plane directions. A second proof mass and a third proof mass are disposed in the first opening and the second opening and are asymmetrically suspended. Separate electrodes are disposed on the substrate and form two differential capacitors with the second proof mass and the third proof mass for sensing the out-of-plane acceleration.

36 Claims, 7 Drawing Sheets

U.S. PATENT DOCUMENTS

| | | | |
|---|---|---|---|
| 7,907,838 B2 * | 3/2011 | Nasiri et al. | 396/55 |
| 7,934,423 B2 * | 5/2011 | Nasiri et al. | 73/514.02 |
| 8,020,441 B2 * | 9/2011 | Seeger | 73/504.12 |
| 8,047,075 B2 * | 11/2011 | Nasiri et al. | 73/514.32 |
| 2001/0032508 A1 * | 10/2001 | Lemkin et al. | 73/514.32 |
| 2003/0066351 A1 * | 4/2003 | Weinberg et al. | 73/504.16 |
| 2004/0211258 A1 * | 10/2004 | Geen | 73/510 |
| 2005/0081631 A1 * | 4/2005 | Weinberg et al. | 73/504.16 |
| 2005/0166675 A1 * | 8/2005 | Hobbs et al. | 73/504.12 |
| 2005/0217374 A1 * | 10/2005 | Chen et al. | 73/504.04 |
| 2007/0062283 A9 * | 3/2007 | Weinberg et al. | 73/504.16 |
| 2009/0139330 A1 * | 6/2009 | Pavelescu et al. | 73/514.32 |
| 2010/0236327 A1 * | 9/2010 | Mao | 73/504.12 |
| 2011/0030473 A1 * | 2/2011 | Acar | 73/504.12 |

* cited by examiner

MULTI-AXIS CAPACITIVE ACCELEROMETER

CROSS-REFERENCE TO RELATED APPLICATION

This application claims the priority benefit of U.S. provisional application Ser. No. 61/115,546, filed on Nov. 18, 2008, all disclosures are incorporated therewith. This application also claims the priority of Taiwan applications serial no. 97148843 and 97151113, filed on Dec. 15, 2008 and Dec. 26, 2008. The entirety of each of the above-mentioned patent applications is hereby incorporated by reference herein and made a part of this specification.

BACKGROUND

1. Technical Field

The disclosure relates to an accelerometer which is manufactured by Micro Electro Mechanical System (MEMS) technology and has the capability of sensing two axes or three axes acceleration.

2. Description of Related Art

Many non-military applications require accelerometer with the ability to sense acceleration along three mutually orthogonal axes. For the applications in modern consumer electronic devices, the size and cost of a multi-axis accelerometer is demanded. The art for a compact accelerometer with a single sensing structure for sensing acceleration along three mutually orthogonal axes is thus needed.

U.S. Pat. No. 6,201,284 discloses an accelerometer which utilizes one single sensing structure with proof masses to detect the acceleration of X, Y and Z axes. The proof masses detecting X-axis and Y-axis accelerations may be interfered by the motion of Z-axis proof mass. A design like this will cause poor cross-axis sensitivities. U.S. Pat. No. 6,845,670 discloses a three-axis accelerometer with only one proof mass, however, this accelerometer adopts a set of non decoupled springs for detecting the acceleration of three axes. This may affect the performance of cross-axis sensitivity seriously. In addition, the motion of the proof mass for sensing Z-axis acceleration disclosed by U.S. Pat. No. 6,845,670 may be a combination of rotation and translation, and this may results in poor linearity of the accelerometer.

U.S. Pat. No. 7,258,012 discloses another accelerometer design with one sensing structure, but the motion of its Z-axis proof mass may also lead to Z-axis output with poor linearity.

SUMMARY

A multi-axis capacitive accelerometer comprises a substrate and a structure layer, wherein the substrate has a plurality of sensing electrodes thereon and a structure layer suspended over the substrate. The structure layer comprises a plurality of anchor bases, a plurality of elastic structures, a first proof mass, a second proof mass, a plurality of first fixed sensing blocks, a third proof mass, a fourth proof mass, and a plurality of second fixed sensing blocks. The anchor bases are fixed on the substrate. The elastic structures comprise at least a first set of elastic linkages, a second set of elastic linkages and a third set of elastic linkages. The first proof mass is suspended over the substrate by the first set of elastic linkages and connected to the anchor bases for constraining the motion of the first proof mass either in a first direction (for example, X-axis) or a second direction (for example, Y-axis) on a plane when sustaining an acceleration, wherein the first direction (for example, X-axis) and the second direction (for example, Y-axis) are perpendicular to one another. The second proof mass is suspended inside the first proof mass by the second set of elastic linkages for deformation in a direction perpendicular and coplanar with the deformation direction of the first proof mass. The first fixed sensing blocks are disposed inside the first mass block, wherein a first capacitive structure is formed between each first fixed sensing block and the corresponding first proof mass or second proof mass. The third proof mass and the fourth proof mass are corresponding to the sensing electrodes on the substrate and are symmetrically disposed at two opposite sides of a central axis of the first proof mass, wherein the third proof mass and the fourth proof mass are asymmetrically suspended inside the second proof mass by the third set of elastic linkages and are provided with rotating axes along the first direction (for example, X-axis) for achieving asymmetry in the second direction (for example, Y-axis). When the first proof mass sustains a force in a third direction (for example, Z-axis) perpendicular to the first direction (for example, X-axis) the second direction (for example, Y-axis), the third proof mass and the fourth proof mass rotate along the rotating axis. The second fixed sensing blocks are disposed inside the first proof mass, wherein each second fixed sensing block forms a second capacitive structure with the second proof mass.

Another multi-axis capacitive accelerometer is further provided herein. The multi-axis capacitive accelerometer comprising a substrate and a structure layer is provided. The substrate has at least two sensing electrodes disposed on a surface thereof. The structure layer comprises a plurality of anchor bases, a first proof mass, a first set of elastic linkages, a plurality of fixed sensing blocks, a second proof mass, a third proof mass, a second set of elastic linkages and a third set of elastic linkages. The anchor bases are fixed on the surface of the substrate. The first proof mass is suspended over the surface of the substrate and symmetrical to a central axis. The first proof mass further has a first opening and a second opening both located inside the first proof mass and symmetrically disposed at two opposite sides of the central axis. The first set of elastic linkages connects the anchor base and the first proof mass. The fixed sensing blocks are adjacent to the first proof mass and situated on the surface of the substrate, wherein a capacitive structure is formed between each of the fixed sensing blocks and the first proof mass. The second proof mass and the third proof mass are respectively located inside the first opening and the second opening, and are suspended over the sensing electrodes of the substrate to form a sensing capacitance. The second set of elastic linkages and the third set of elastic linkages are respectively connected between the second proof mass and the first proof mass and between the third proof mass and the first proof mass for asymmetrically suspending the second proof mass and the third proof mass in the first opening and the second opening. The second proof mass and the third proof mass rotates along axes parallel to an X-axis respectively when sustaining an acceleration along a Z-axis, wherein the rotating axis of the second proof mass and the rotating axis of the third proof mass are symmetrically disposed at two opposite sides of the central axis of the first proof mass.

Accordingly, the aforementioned multi-axis capacitive accelerometer is provided with a plurality of proof masses disposed inside a structure layer, wherein the proof masses are adapted to rotate symmetrically along a central axis of the structure layer. The proof masses are symmetrical structures themselves to eliminate linear shift in rotation when sustaining a force and thus improve the linearity of sensing. Furthermore, when the second proof mass and the third proof mass rotate as sustaining a force, components of force in the first direction and the second direction goes counterbalanced by one another to prevent interference for sensing the in-plane acceleration.

BRIEF DESCRIPTION OF THE DRAWINGS

The accompanying drawings are included to provide a further understanding, and are incorporated in and constitute a part of this specification. The drawings illustrate embodiments and, together with the description, serve to explain the principles of the invention.

DESCRIPTION OF THE EMBODIMENTS

Reference will now be made in detail to the present embodiments, examples of which are illustrated in the accompanying drawings. Wherever possible, the same reference numbers are used in the drawings and the description to refer to the same or like parts.

For resolving the problem in sensitivity and linearity of the conventional three-axis accelerometer and conforming the requirement of miniaturization, a multi-axis capacitive accelerometer capable of eliminating mutual interference of acceleration sensing in different axes is provided to achieve high sensitivity and linearity.

Figure 1:
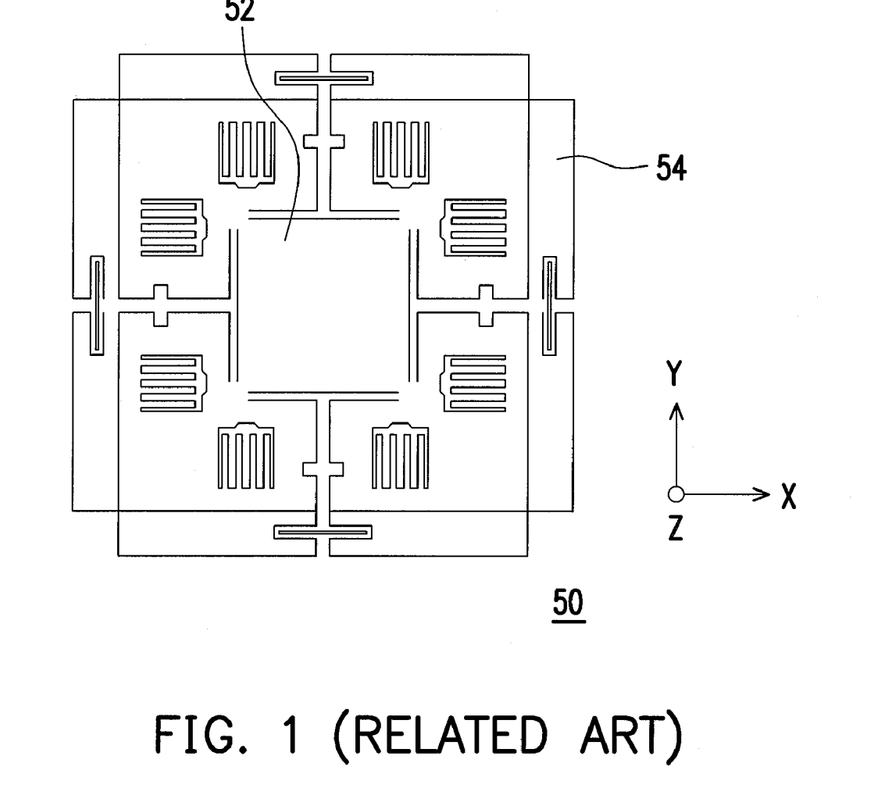
FIG. 1 shows a top view of a conventional multi-axis capacitive accelerometer.
Figure 2:
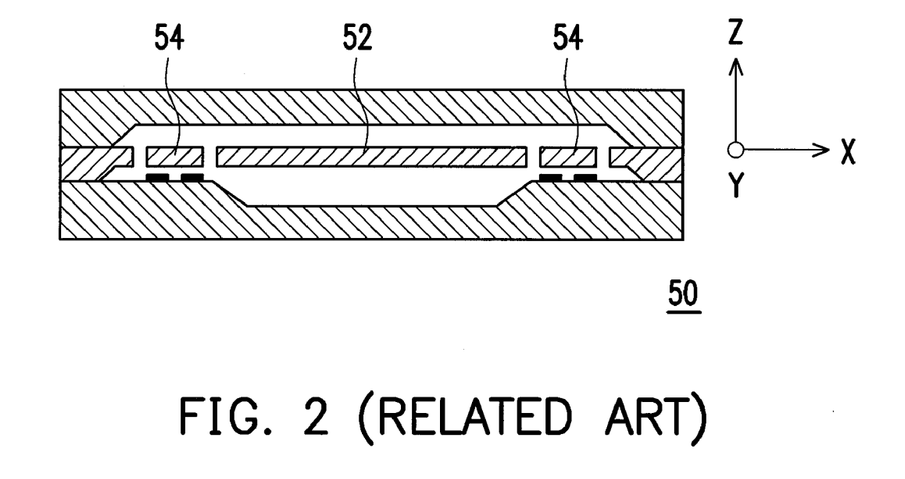
FIG. 2 shows a sectional view of the conventional multi-axis capacitive accelerometer illustrated in FIG. 1.
Figure 3:
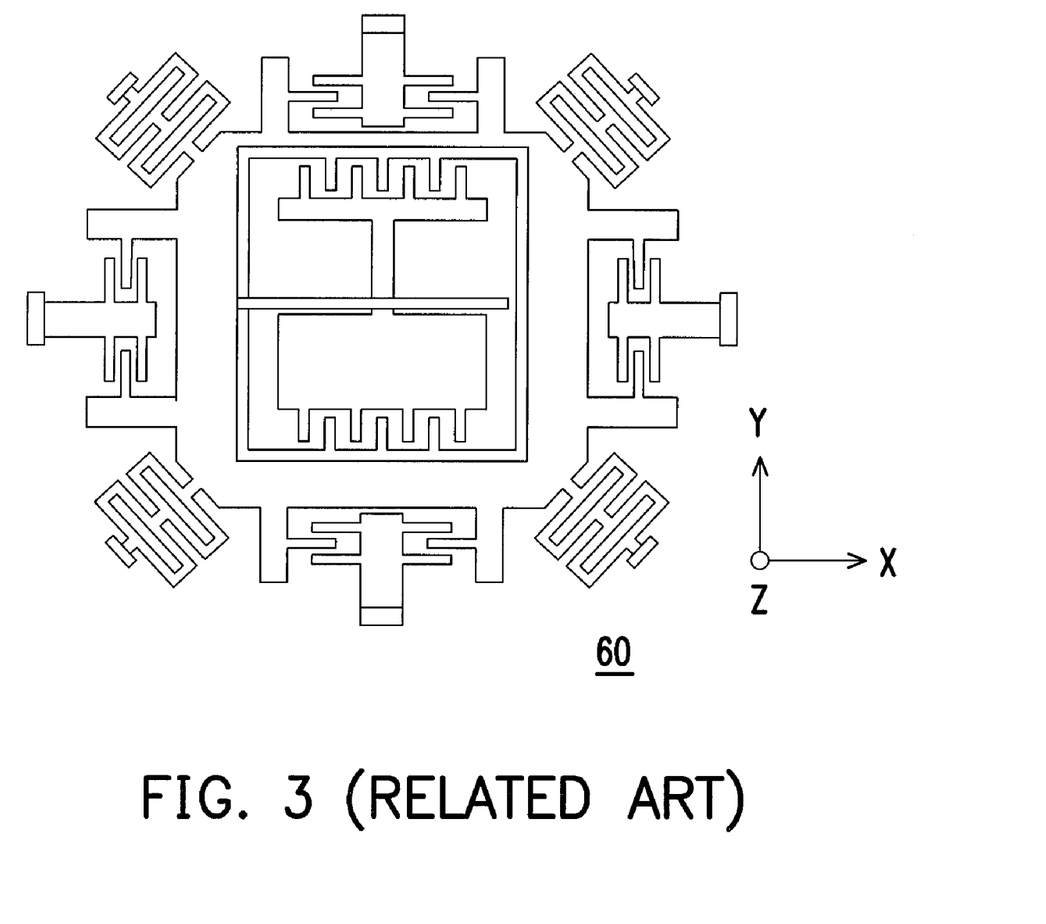
FIG. 3 shows a top view of another conventional multi-axis capacitive accelerometer.
Figure 4:
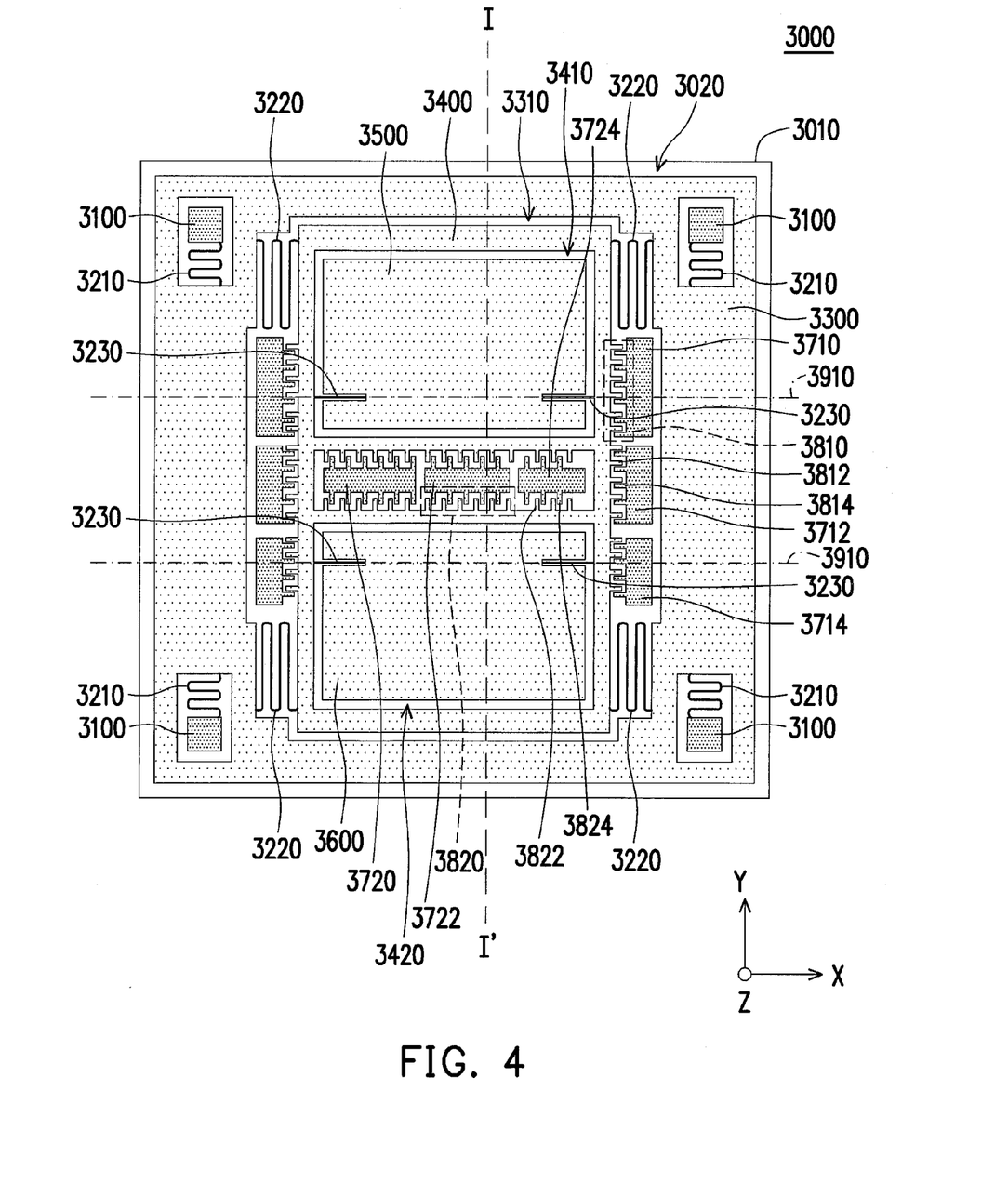
FIG. 4 shows a top view of a multi-axis capacitive accelerometer according to an embodiment.
Figure 5:
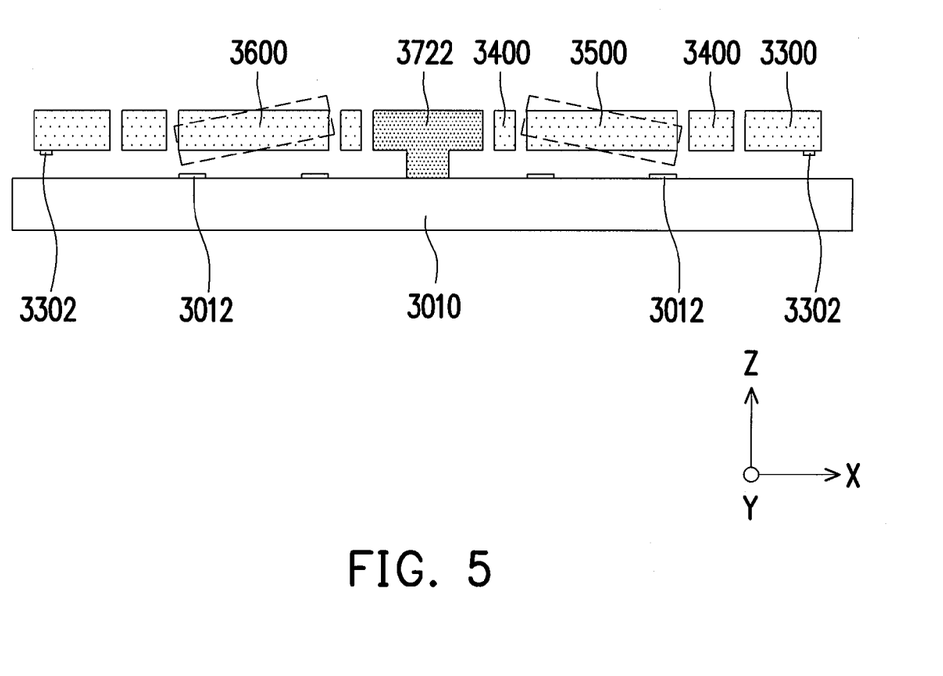
FIG. 5 is a sectional view of the multi-axis capacitive accelerometer illustrated in FIG. 4 along line I-I'.

FIG. 4 shows a top view of a multi-axis capacitive accelerometer according to further another embodiment. FIG. 5 is a sectional view of the multi-axis capacitive accelerometer illustrated in FIG. 4 along line I-I'. Referring to FIG. 4 and FIG. 5, the multi-axis capacitive accelerometer 3000 comprises a substrate 3010 and a structure layer 3020. The substrate 3010 has a plurality of sensing electrodes 3012, and the structure layer 3020 is suspended over the substrate 3010. The structure layer 3020 is for example a semiconductor structure layer comprising the following components. Anchor bases 3100 are fixed on the substrate 3010. In this embodiment, the anchor bases 3100 are for example located inside a first proof mass 3300. The first proof mass 3300 has an opening 3310, and a second proof mass 3400 is disposed inside the opening 3310. The second proof mass 3400 has an opening 3410 and an opening 3420, wherein a third proof mass 3500 is disposed inside the opening 3410, and a fourth proof mass 3600 is disposed inside the opening 3420. Elastic structures comprising at least a first set of elastic linkages 3210, a second set of elastic linkages 3220 and a third set of elastic linkages 3230 are provided, wherein the first set of elastic linkages 3210 is connected between the anchor base 3100 and the first proof mass 3300, and the second set of elastic linkages 3220 is connected between the first proof mass 3300 an the second proof mass 3400. The first proof mass 3300 is suspended over the substrate 3010 by the first set of elastic linkages 3210 and connected to the anchor bases 3100 for sensing an acceleration along a first direction (i.e., X-axis) or a second direction (i.e., Y-axis), and constraining the motion of the first proof mass 3300 either in X-axis or Y-axis. The second proof mass 3400 is suspended inside the first proof mass 3300 by the second set of elastic linkages 3220 for shifting in a direction perpendicular and coplanar with the shifting direction of the first proof mass 3300. For example, when the first proof mass 3300 shifts along X-axis, the second proof mass 3400 shifts along Y-axis.

Referring to FIG. 4, first fixed sensing blocks 3710, 3712 and 3714 are disposed inside the first proof mass 3300. Herein, the first fixed sensing blocks 3710 and 3712 being as a pair of sensing blocks can be adopted for differential sensing, while the first fixed sensing blocks 3714 can be used for self-test. A third proof mass 3500 and a fourth proof mass 3600 are corresponding to the sensing electrodes 3012 on the substrate 3010 and being symmetrically disposed at two opposite sides of a central axis of the first proof mass 3300. The third proof mass 3500 and the fourth proof mass 3600 are asymmetrically suspended inside the second proof mass 3400 by the third set of elastic linkages 3230 and are provided with rotating axes 3910 along the first direction for achieving asymmetry along Y-axis. When the first proof mass 3300 sustains a force in a third direction (i.e. Z-axis) perpendicular to X-axis and Y-axis, the third proof mass 3500 and the fourth proof mass 3600 rotate along the rotating axis 3910 (referring to the dash line of FIG. 5). The above sensing electrodes 3012 are disposed at two opposite sides of the rotating axis 3910.

In addition, second fixed sensing blocks 3720, 3722 and 3724 are disposed inside the second proof mass 3400. Herein, the second fixed sensing blocks 3720 and 3722 being as a pair of sensing blocks can be adopted for differential sensing, while the second fixed sensing blocks 3724 can be used for self-test.

In this embodiment, capacitive structures are formed between each first fixed sensing block 3710, 3712 or 3714 and the corresponding second proof mass 3400 (or the corresponding first proof mass 3300). For example, a first capacitive structure 3810 is formed between the first fixed sensing block 3710, 3712 or 3714 and the corresponding second proof mass 3400 (or the first proof mass 3300). The first capacitive structure 3810 comprises a comb-like electrode 3812 extended from the first proof mass 3300 or the second proof mass 3400 and having a plurality of comb-like capacitive plates, and a fixed comb-like electrode 3814 extended from the first fixed sensing blocks 3710, 3712 or 3714 and having a plurality of fixed comb-like capacitive plates. The comb-like capacitive plates of the comb-like electrode 3812 and the fixed comb-like capacitive plates of the fixed comb-like electrode 3814 are disposed in parallel and alternately, and are for example extended along X-axis for sensing the acceleration in Y-axis.

The second fixed sensing blocks 3720, 3722 and 3724 forms second capacitive structures 3820 with the second proof mass 3400. The second capacitive structure 3820 comprises a comb-like electrode 3822 extended from the second proof mass 3400 and having a plurality of comb-like capacitive plates, and a fixed comb-like electrode 3824 extended from the second fixed sensing blocks 3720, 3722 or 3724 and having a plurality of fixed comb-like capacitive plates. The comb-like capacitive plates of the comb-like electrode 3822 and the fixed comb-like capacitive plates of the fixed comb-like electrode 3824 are disposed in parallel and alternately, and are for example extended along Y-axis for sensing the acceleration in X-axis.

Furthermore, the first set of elastic linkages 3210 is connected between the first proof mass 3300 and the anchor bases 3100 for driving the first proof mass 3300 moving along X-axis or Y-axis. The second set of elastic linkages 3220 is connected between the second proof mass 3400 and the first proof mass 3300 for driving the second proof mass 3400 shifting in a direction perpendicular to and coplanar with a shifting direction of the first proof mass 3300. The first proof mass 3300 and the second proof mass 3400 move on the same plane through the first set of elastic linkages 3210 and the second set of elastic linkages 3220. Moreover, the third set of elastic linkages 3230 is disposed between the second proof mass 3400 and the third proof mass 3500 and between the second proof mass 3400 and the fourth proof mass 3600. The third set of elastic linkages 3230 is connected to two ends of the corresponding rotating axes 3910 for driving the third proof mass 3500 and the fourth proof mass 3600 rotating along the corresponding rotating axes 3910.

The first proof mass 3300 has a bottom surface, and a plurality of bumps 3302 may be formed on the bottom surface for preventing the first proof mass 3300 and the substrate 3010 from sticking with one another and affecting the acceleration sensing efficiency. Furthermore, the third proof mass 3500 and the fourth proof mass 3600 may further have a plurality of micro-holes (not shown) thereon to reduce damping effect.

Figure 6:
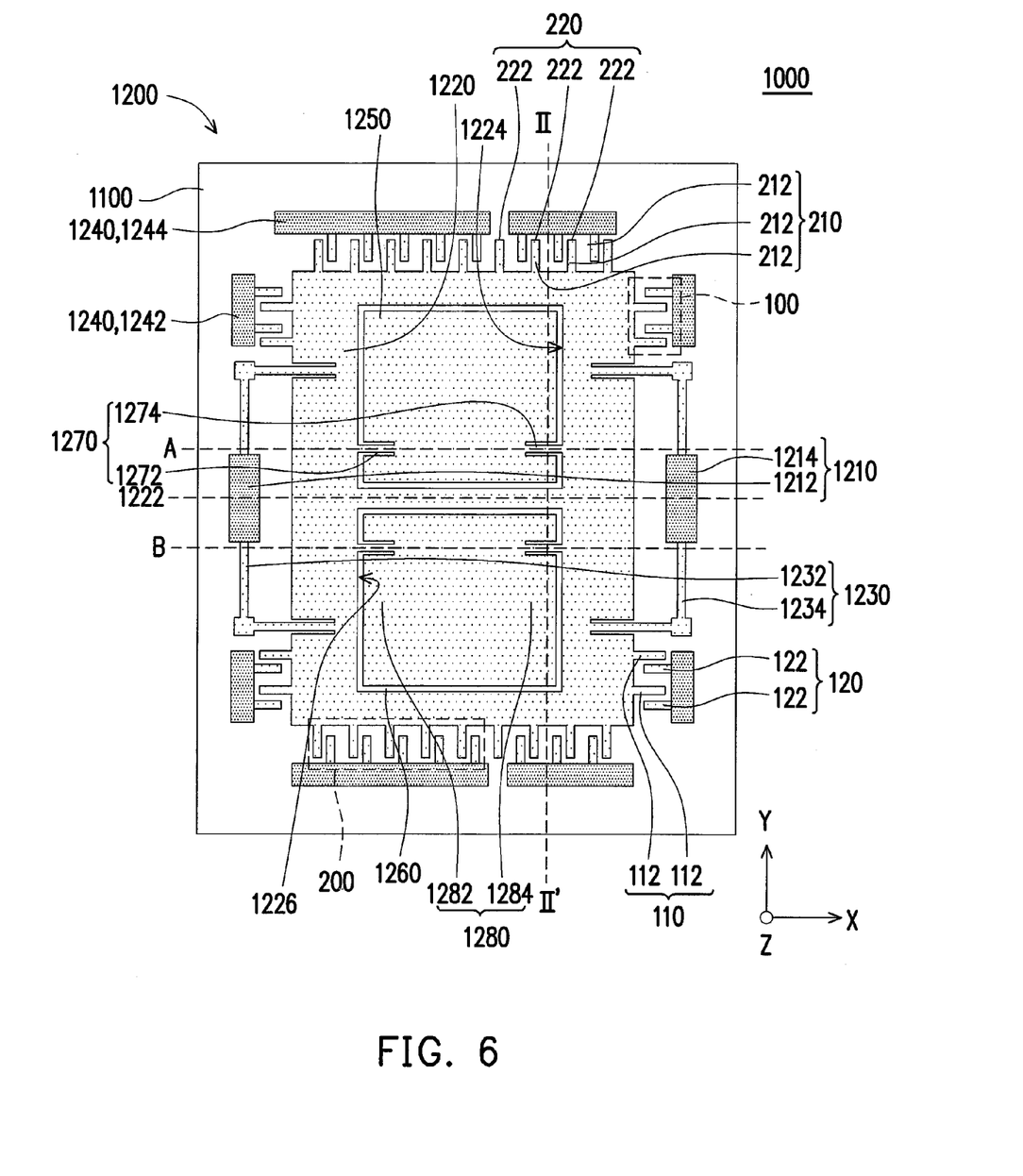
FIG. 6 shows a top view of a multi-axis capacitive accelerometer according to another embodiment.
Figure 7:
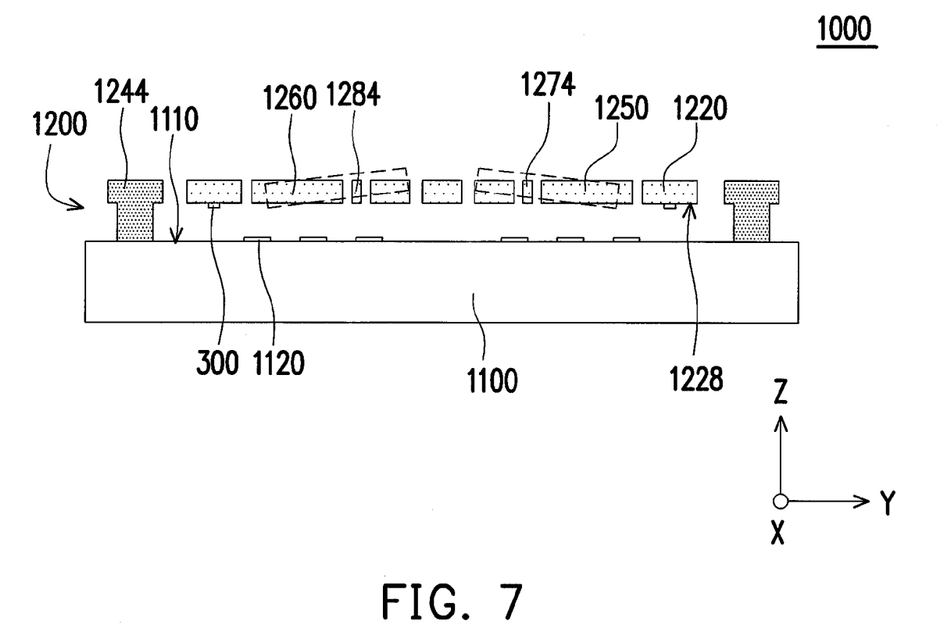
FIG. 7 is a sectional view of the multi-axis capacitive accelerometer illustrated in FIG. 6 along line II-II'.

FIG. 6 shows a top view of a multi-axis capacitive accelerometer according to another embodiment. FIG. 7 is a sectional view of the multi-axis capacitive accelerometer illustrated in FIG. 6 along line II-II'. Referring to FIG. 6 and FIG. 7, the multi-axis capacitive accelerometer 1000 comprises a substrate 1100 and a structure layer 1200. The substrate 1100 has a surface 1110 and a plurality of sensing electrodes 1120 thereon. The structure layer 1200 comprises a plurality of anchor bases 1210, a first proof mass 1220, a first set of elastic linkages 1230, a plurality of fixed sensing blocks 1240, a second proof mass 1250, a third proof mass 1260, a second set of elastic linkages 1270 and a third set of elastic linkages 1280.

The first proof mass 1220 is disposed over the surface 1110 of the substrate 1100. The first proof mass 1220 has a central axis 1222 and a first opening 1224 and a second opening 1226 both located inside the first proof mass 1220. The first opening 1224 and the second opening 1226 are symmetrically disposed at two opposite sides of the central axis 1222 of the first proof mass 1220. The first set of elastic linkages 1230 is connected between the anchor bases 1210 and the first proof mass 1220. Therefore, the first proof mass 1220 is suspended over the substrate 1100. Furthermore, the anchor bases 1210 include a first fixed block 1212 and a second fixed block 1214. The first fixed block 1212 and the second fixed block 1214 are fixed on the surface 1110 of the substrate 1100, and located at two opposite outer sides of the first proof mass 1220.

The fixed sensing blocks 1240 comprise a plurality of first fixed sensing blocks 1242 and a plurality of second fixed sensing blocks 1244. The first fixed sensing blocks 1242 and the second fixed sensing blocks 1244 are adjacent to and located outside the first proof mass 1220 and are fixed on the surface 1110 of the substrate 1100. Each first fixed sensing block 1242 and each second fixed sensing block 1244 respectively form a first capacitive structure 100 and a second capacitive structure 200 with the first proof mass 1220, for sensing accelerations in Y-axis and X-axis by variations of capacitance. The second proof mass 1250 and the third proof mass 1260 are suspended over the sensing electrodes 1120 and respectively located within the first opening 1224 and the second opening 1226 of the first proof mass 1220. The second proof mass 1250 and the third proof mass 1260 respectively form sensing capacitances with the sensing electrodes 1120 of the substrate 1100, so as to sensing an acceleration in Z-axis by variation of the sensing capacitance.

The second proof mass 1250 and the third proof mass 1260 are asymmetrically suspended on the first proof mass 1220 by the second set of elastic linkages 1270 and the third set of elastic linkages 1280. In addition, the second proof mass 1250 and the third proof mass 1260 respectively rotate along a first rotating axis A and a second rotating axis B to induce a variation of capacitance when sustaining a force. The first rotating axis A of the second proof mass 1250 and the second rotating axis B of the third proof mass 1260 are parallel and symmetrically disposed at two opposite sides of the central axis 1222 of the first proof mass 1220. In other words, the second proof mass 1250 and the third proof mass 1260 can rotate symmetrically with one another (referring to the dash line of FIG. 7). The second proof mass 1250 and the third proof mass 1260 are respectively imbalanced structures themselves. Therefore, when sustaining a force along Z-axis, the second proof mass 1250 and the third proof mass 1260 rotate without Z-axis shift and provide high sensing linearity. Furthermore, the second proof mass 1250 and the third proof mass 1260 are independent from the first proof mass 1220 when rotating, and interference for sensing the in-plane acceleration can be prevented.

Referring to FIG. 6, each first capacitive structure 100 comprises a comb-like electrode 110 horizontally extended from the first proof mass 1220 and a fixed comb-like electrode 120 horizontally extended from the fixed sensing block 1240. The comb-like electrode 110 has a plurality of comb-like capacitive plates 112. The fixed comb-like electrode 120 has a plurality of fixed comb-like capacitive plates 122. The comb-like capacitive plates 112 and the fixed comb-like capacitive plates 122 are arranged in parallel and alternately. Each second capacitive structure 200 is configured similarly to the first capacitive structure 100, and thus the configuration of the second capacitive structures 200 is not repeated herein.

The comb-like capacitive plates 112 and the comb-like capacitive plates 122 of each first capacitive structure 100 extend along the X-axis parallel to the surface 1110 of the substrate 1100. The comb-like capacitive plates 212 and the comb-like capacitive plates 222 of each second capacitive structure 200 extend along the Y-axis parallel to the surface 1110 of the substrate 1100. The X-axis is perpendicular to the Y-axis. The first capacitive structure 100 and the second capacitive structure 200 respectively generate a variation of capacitance due to shifts of the first proof mass 1220 in Y-axis and X-axis for sensing accelerations in Y-axis and X-axis. In other words, the first capacitive structures 100 are capable of detecting the acceleration in Y-axis, while the second capacitive structures 200 are capable of detecting the acceleration in X-axis.

Referring to FIG. 6, the first set of elastic linkages 1230 comprises a first spring 1232 and a second spring 1234 respectively corresponding to the first fixed block 1212 and the second fixed block 1214. The first spring 1232 and the second spring 1234 respectively provide restoring force along X-axis and Y-axis, which eliminates the mutual interference between sensing in X-axis and sensing in Y-axis. The first spring 1232 or the second spring 1234 can be configured in L shape. In addition, the first proof mass 1220 is connected to the first fixed block 1212 and the second fixed block 1214 respectively via the first spring 1232 and the second spring 1234.

In this embodiment, the second set of elastic linkages 1270 comprises a third spring 1272 and a fourth spring 1274, located on the first rotating axis A and at two opposite sides of the second proof mass 1250 so that the second proof mass 1250 performs an asymmetric rotation along the first rotating axis A. The third set of elastic linkages 1280 comprises a fifth spring 1282 and a sixth spring 1284 located on the second rotating axis B and at two opposite sides of the third proof mass 1260 so that the third proof mass 1260 performs an asymmetric rotation along the second rotating axis B.

In addition, referring to FIG. 7, the first proof mass 1220 has a bottom surface 1228 facing the substrate 1100 and a plurality of bumps 300 on the bottom surface 1228. The bumps 300 prevent the first proof mass 1220 and the substrate 1100 from sticking with one another and affecting the acceleration sensing efficiency. In more detail, a gap is kept between the first proof mass 1220 and the substrate 1100, and the bumps 300 can prevent the first proof mass 1220 from sticking with the substrate 1100 by moisture in manufacturing or using. Furthermore, the second proof mass 1250 and the third proof mass 1260 may further have a plurality of micro-holes thereon to reduce damping effect.

Figure 8:
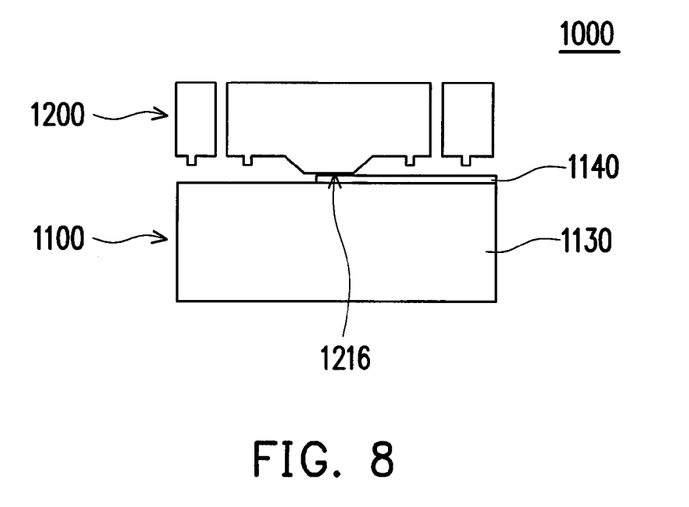
FIG. 8 is a partial sectional view of the multi-axis capacitive accelerometer illustrated in FIG. 6.

FIG. 8 is a partial sectional view of the multi-axis capacitive accelerometer illustrated in FIG. 6. In this embodiment, the substrate 1100, for example, is a glass wafer comprising a glass base layer 1130 and a conductive layer 1140 (for example, wires or bonding pads) thereon. The structure layer 1200 can be a silicon wafer, wherein the first proof mass 1220, the bumps 300, the second proof mass 1250, the third proof mass 1260, the first set of elastic linkages 1230, the second set of elastic linkages 1270, the third set of elastic linkages 1280, the anchor bases 1210, the fixed sensing blocks 1240, the comb-like electrodes 110 or 210 and the fixed comb-like electrodes 120 or 220 illustrated in FIG. 6 and FIG. 7 can be integrally formed by performing a dry etching process. The silicon wafer (i.e. the structure layer 1200) is bonded to the glass wafer (i.e. the substrate 1100) by anodic bonding technology. In addition, contact metals 1216 are formed on the bottom of the anchor bases 1210 of the structure layer 1200 for transmitting sensing signals to the bonding pads and wires of the substrate 1100.

Figure 9:
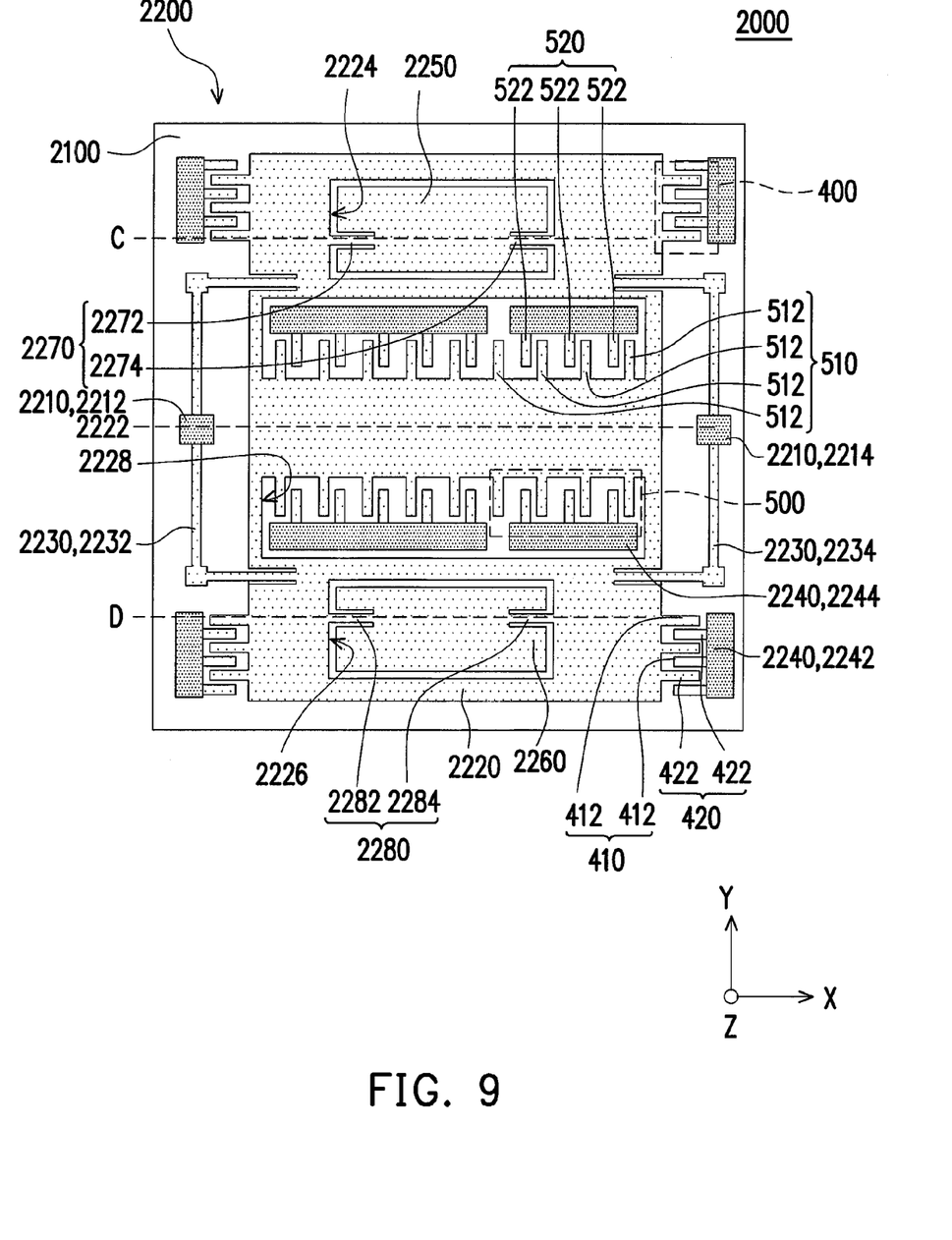
FIG. 9 shows a top view of a multi-axis capacitive accelerometer according to further another embodiment.

FIG. 9 shows a top view of a multi-axis capacitive accelerometer according to further another embodiment. Comparing to the multi-axis capacitive accelerometer illustrated in FIG. 6 and FIG. 7, the first proof mass 2220 of the present embodiment further has a plurality of third opening 2228. A part of the fixed sensing blocks 2240, a part of the comb-like capacitive plates 512 and a part of the fixed comb-like capacitive plates 522 are located within the third opening 2228 for providing the same sensing function as illustrated in the above embodiment. In this configuration, the second capacitive structures 500 are located inside the first proof mass 2220. The comb-like electrodes 510 and the fixed comb-like electrodes 520 inside the third opening 2228 form capacitive structures for sensing acceleration along X-axis. In the other hand, the first capacitive structures 400 are arranged outside the first proof mass 2220 for sensing acceleration along Y-axis. The multi-axis capacitive accelerometer 2000 of this embodiment is illustrated in the following.

Referring to FIG. 9, the multi-axis capacitive accelerometer 2000 comprises a substrate 2100 and a structure layer 2200. The structure layer 2200 comprises a plurality of anchor bases 2210, a first proof mass 2220, a first set of elastic linkages 2230, a plurality of fixed sensing blocks 2240, a second proof mass 2250, a third proof mass 2260, a second set of elastic linkages 2270 and a third set of elastic linkages 2280.

The first proof mass 2220 is disposed over the substrate 2100. The first proof mass 2220 has a central axis 2222 and a first opening 2224, a second opening 2226 and a plurality of third openings 2228 located inside the first proof mass 2220. The first opening 2224 and the second opening 2226 are symmetrically disposed at two opposite sides of a central axis 2222 of the first proof mass 2220. The first set of elastic linkages 2230 is connected between the anchor bases 2210 and the first proof mass 2220. Therefore, the first proof mass 2220 is suspended over the substrate 2100. In addition, the anchor bases 2210 comprise a first fixed block 2212 and a second fixed block 2214. The first fixed block 2212 and the second fixed block 2214 are fixed on a surface of the substrate 2100 and respectively located at two opposite outer sides of the first proof mass 2220.

The fixed sensing blocks 2240 comprise a plurality of first fixed sensing blocks 2242 and a plurality of second fixed sensing blocks 2244. The first fixed sensing blocks 2242 are adjacent to and located outside the first proof mass 2220 and are fixed on the substrate 2100. The second fixed sensing blocks 2244 are located within the third openings 2228 and fixed on the substrate 2100, that differs from the configuration of the multi-axis capacitive accelerometer 1000 illustrated in FIG. 6. Each first fixed sensing block 2242 and each second fixed sensing block 2244 respectively form a first capacitive structure 400 and a second capacitive structure 500 with the first proof mass 2220, for sensing accelerations in Y-axis and X-axis by variations of capacitance. The second proof mass 2250 and the third proof mass 2260 are suspended over sensing electrodes (similar to the sensing electrodes 1120 in FIG. 7) on the substrate 2100 and are respectively located within the first opening 2224 and the second opening 2226 of the first proof mass 2220. The second proof mass 2250 and the third proof mass 2260 respectively form sensing capacitances with the sensing electrodes of the substrate 2100, so as to sensing an acceleration in Z-axis by variation of the sensing capacitance.

The second proof mass 2250 and the third proof mass 2260 are asymmetrically suspended on the first proof mass 2220 by the second set of elastic linkages 2270 and the third set of elastic linkages 2280. In addition, the second proof mass 2250 and the third proof mass 2260 respectively rotate along a first rotating axis C and a second rotating axis D to induce a variation of capacitance when sustaining a force. The first rotating axis C of the second proof mass 2250 and the second rotating axis D of the third proof mass 2260 are parallel and symmetrically disposed at two opposite sides of the central axis 2222 of the first proof mass 2220. In other words, the second proof mass 2250 and the third proof mass 2260 can rotate symmetrically with one another. The second proof mass 2250 and the third proof mass 2260 are respectively imbalanced structures themselves. Therefore, when sustaining a force along Z-axis, the second proof mass 2250 and the third proof mass 2260 rotate without Z-axis shift and provide high sensing linearity. Furthermore, the second proof mass 2250 and the third proof mass 2260 are independent from the first proof mass 2220 when rotating, and thus the interference for sensing the in-plane acceleration can be prevented.

Each first capacitive structure 400 comprises a comb-like electrode 410 horizontally extended from the first proof mass 2220 and a fixed comb-like electrode 420 horizontally extended from the fixed sensing block 2240. The comb-like electrode 410 has a plurality of comb-like capacitive plates 412. The fixed comb-like electrode 420 has a plurality of fixed comb-like capacitive plates 422. The comb-like capacitive plates 412 and the fixed comb-like capacitive plates 422 are arranged in parallel and alternately. Each second capacitive structure 500 is configured similarly to the first capacitive structure 400, and thus the configuration of the second capacitive structures 500 is not repeated herein.

The comb-like capacitive plates 412 and the comb-like capacitive plates 422 of each first capacitive structure 400 extend along the X-axis parallel to the surface of the substrate 2100. The comb-like capacitive plates 512 and the comb-like capacitive plates 522 of each second capacitive structure 500 extend along the Y-axis parallel to the surface of the substrate 2100. The X-axis is perpendicular to the Y-axis. The first capacitive structure 400 and the second capacitive structure 500 respectively generate a variation of capacitance due to shifts of the first proof mass 2220 in Y-axis and X-axis for sensing accelerations in Y-axis and X-axis. In other words, the first capacitive structures 400 are capable of detecting the acceleration in Y-axis, while the second capacitive structures 500 are capable of detecting the acceleration in X-axis.

The first set of elastic linkages 2230 comprises a first spring 2232 and a second spring 2234 respectively corresponding to the first fixed block 2212 and the second fixed block 2214. The first spring 2232 and the second spring 2234 respectively provide restoring force along X-axis and Y-axis, which eliminates the mutual interference between sensing in X-axis and sensing in Y-axis direction. The first spring 2232 or the second spring 2234 can be configured in L shape. In addition, the first proof mass 2220 is connected to the first fixed block 2212 and the second fixed block 2214 respectively via the first spring 2232 and the second spring 2234.

In this embodiment, the second set of elastic linkages 2270 comprises a third spring 2272 and a fourth spring 2274, located on the first rotating axis C and at two opposite sides of the second proof mass 2250 so that the second proof mass 2250 performs an asymmetric rotation along the first rotating axis C. The third set of elastic linkages 2280 comprises a fifth spring 2282 and a sixth spring 2284 located on the second rotating axis D and at two opposite sides of the third proof mass 2260 so that the third proof mass 2260 performs an asymmetric rotation along the second rotating axis D.

In addition, referring to FIG. 9, the first proof mass 2220 has a bottom surface facing the substrate 2100 and a plurality of bumps (similar to the bumps 300 in FIG. 7) on the bottom surface. The bumps prevent the first proof mass 2220 and the substrate 2100 from sticking with one another and affecting the acceleration sensing efficiency. In more detail, a gap is kept between the first proof mass 2220 and the substrate 2100, and the bumps can prevent the first proof mass 2220 from sticking with the substrate 2100 by moisture in manufacturing or using. Furthermore, the second proof mass 2250 and the third proof mass 2260 may further have a plurality of micro-holes thereon to reduce damping effect.

In this embodiment, the substrate 2100, for example, is a glass wafer comprising a glass base layer and a conductive layer (for example, wires or bonding pads as shown in FIG. 8) thereon. The structure layer 2200 can be a silicon wafer, wherein the first proof mass 2220, the bumps, the second proof mass 2250, the third proof mass 2260, the first set of elastic linkages 2230, the second set of elastic linkages 2270, the third set of elastic linkages 2280, the anchor bases 2210, the fixed sensing blocks 2240, the comb-like electrodes 410 or 510 and the fixed comb-like electrodes 420 or 520 can be integrally formed by performing a dry etching process. The silicon wafer (i.e. the structure layer 2200) is bonded to the glass wafer (i.e. the substrate 2100) by anodic bonding technology. In addition, contact metals can be formed on the bottom of the anchor bases 2210 of the structure layer 2200 for transmitting sensing signals to the bonding pads and wires of the substrate 2100.

It is noted that the fixed sensing blocks and the capacitive structures are not limited to be disposed inside or outside the first proof mass. In further another embodiment not shown, all of the fixed sensing blocks and the capacitive structures are located inside the first proof mass to provide similar sensing function as described in the aforementioned embodiment.

The aforementioned elastic structures of the above embodiments may comprise springs or other equivalent components.

In summary, the above embodiments provide a multi-axis capacitive accelerometer with a plurality of independent proof masses in the structure layer, wherein the proof masses themselves and the rotating axes thereof are symmetric to the central axis of the first proof mass, so as to rotate symmetrically along the central axis of the first proof mass. The proof masses are imbalanced structures themselves to eliminate linear shift in rotation when sustaining a force and thus provide superior linearity. Furthermore, the proof masses for sensing out-of-plane acceleration are independent to that for sensing in-plane acceleration and have sufficient weight contributing to high precision and sensitivity. Moreover, independent mechanisms in two axes for the in-plane acceleration sensing, for example, independent elastic structures capable of providing restoring forces in two orthogonal directions or two independent proof masses capable of shifting in different directions on the same plane, are provided. Therefore, the in-plane acceleration sensing in different directions such as X-axis and Y-axis have no interference with one another.

It will be apparent to those skilled in the art that various modifications and variations can be made to the structure of the exemplary embodiments without departing from the scope or spirit of the invention. In view of the foregoing, it is intended that the present invention cover modifications and variations of this exemplary embodiments provided fall within the scope of the following claims and their equivalents.

What is claimed is:

1. A multi-axis capacitive accelerometer, comprising:
   a substrate, having a plurality of sensing electrodes thereon;
   a structure layer, suspended over the substrate, the structure layer comprises:
      a plurality of anchor bases, fixed on the substrate;
      a plurality of elastic structures, comprising at least a first set of elastic linkages, a second set of elastic linkages and a third set of elastic linkages;
      a first proof mass, suspended over the substrate by the first set of elastic linkages and connected to the anchor bases for constraining motion of the first proof mass either in a first direction or a second direction on a plane when sustaining an acceleration, wherein the first direction and the second direction are perpendicular to one another;
      a second proof mass, suspended inside the first proof mass by the second set of elastic linkages for shifting in a direction perpendicular and coplanar with the shifting direction of the first proof mass;
      a plurality of first fixed sensing blocks, disposed inside the first proof mass, wherein a first capacitive structure is formed between each first fixed sensing block and the corresponding first proof mass or second proof mass;
      a third proof mass and a fourth proof mass, corresponding to the sensing electrodes on the substrate and being symmetrically disposed at two opposite sides of a central axis of the first proof mass, wherein the third proof mass and the fourth proof mass are asymmetrically suspended inside the second proof mass by the third set of elastic linkages and are provided with rotating axes along the first direction for achieving asymmetry in the second direction, and when the first proof mass sustains a force in a third direction perpendicular to the first direction and the second direction, the third proof mass and the fourth proof mass rotate along a rotating axis; and a plurality of second fixed sensing blocks, disposed inside the first proof mass, wherein each second fixed sensing block forms a second capacitive structure with the second proof mass.

2. The multi-axis capacitive accelerometer according to claim 1, wherein each first capacitive structure comprises:

a comb-like electrode, extended from the first proof mass or the second proof mass, and having a plurality of comb-like capacitive plates; and a fixed comb-like electrode, extended from one of the first fixed sensing blocks and having a plurality of fixed comb-like capacitive plates, wherein the comb-like capacitive plates and the fixed comb-like capacitive plates are disposed in parallel and alternately.

3. The multi-axis capacitive accelerometer according to claim 2, wherein the comb-like capacitive plates and the fixed comb-like capacitive plates of each first capacitive structure are extended in the first direction for sensing an acceleration in the second direction.

4. The multi-axis capacitive accelerometer according to claim 1, wherein each second capacitive structure comprises:

a comb-like electrode, extended from the second proof mass, and having a plurality of comb-like capacitive plates; and a fixed comb-like electrode, extended from one of the second fixed sensing blocks and having a plurality of fixed comb-like capacitive plates, wherein the comb-like capacitive plates and the fixed comb-like capacitive plates are disposed in parallel and alternately.

5. The multi-axis capacitive accelerometer according to claim 4, wherein the comb-like capacitive plates and the fixed comb-like capacitive plates of each second capacitive structure are extended in the second direction for sensing an acceleration in the first direction.

6. The multi-axis capacitive accelerometer according to claim 1, wherein the first set of elastic linkages is connected between the first proof mass and the anchor bases for driving the first proof mass shifting in the first direction or the second direction.

7. The multi-axis capacitive accelerometer according to claim 1, wherein the second set of elastic linkages is connected between the second proof mass and the first proof mass for driving the second proof mass shifting in a direction perpendicular to and coplanar with a shifting direction of the first proof mass.

8. The multi-axis capacitive accelerometer according to claim 1, wherein the third set of elastic linkages is disposed between the second proof mass and the third proof mass and between the second proof mass and the fourth proof mass and respectively connected to two ends of corresponding rotating axes for driving the third proof mass and the fourth proof mass rotating along the corresponding rotating axes.

9. The multi-axis capacitive accelerometer according to claim 1, wherein the sensing electrodes of the substrate are disposed at two opposite sides of each rotating axis.

10. The multi-axis capacitive accelerometer according to claim 1, wherein the first proof mass has a bottom surface facing the substrate and a plurality of bumps on the bottom surface.

11. The multi-axis capacitive accelerometer according to claim 1, wherein the third proof mass and the fourth proof mass are provided with a plurality of micro-holes for reducing damping effect.

12. The multi-axis capacitive accelerometer according to claim 1, wherein the first proof mass has a first opening for accommodating the second proof mass, and the second proof mass has a second opening for accommodating the third proof mass and a third opening for accommodating the fourth proof mass.

13. The multi-axis capacitive accelerometer according to claim 1, wherein the first set of elastic linkages connects the anchor bases and the first proof mass, and the second set of elastic linkages connects the first proof mass and the second proof mass.

14. The multi-axis capacitive accelerometer according to claim 1, wherein the elastic structures comprise springs.

15. A multi-axis capacitive accelerometer, comprising:

a substrate, having at least two sensing electrodes disposed on a surface thereof;

a structure layer, comprising:

a plurality of anchor bases, fixed on the surface of the substrate;

a first proof mass, suspended over the surface of the substrate and provided with a central axis, the first proof mass further having a first opening and a second opening both located inside the first proof mass and symmetrically disposed at two opposite sides of the central axis;

a first set of elastic linkages, connecting the anchor base and the first proof mass;

a plurality of fixed sensing blocks, adjacent to the first proof mass and situated on the surface of the substrate, wherein a capacitive structure is formed between each of the fixed sensing blocks and the first proof mass;

a second proof mass and a third proof mass, respectively located inside the first opening and the second opening, and suspended over the sensing electrodes of the substrate to form a sensing capacitance; and a second set of elastic linkages and a third set of elastic linkages, respectively connected between the second proof mass and the first proof mass and between the third proof mass and the first proof mass for asymmetrically suspending the second proof mass and the third proof mass in the first opening and the second opening, respectively, the second proof mass and the third proof mass rotating along axes parallel to an X-axis when sustaining an acceleration along a Z-axis, wherein a rotating axis of the second proof mass and a rotating axis of the third proof mass are symmetrically disposed at two opposite sides of the central axis of the first proof mass.

16. The multi-axis capacitive accelerometer according to claim 15, wherein the fixed sensing blocks are located outside the first proof mass.

17. The multi-axis capacitive accelerometer according to claim 16, wherein each capacitive structure formed by the fixed sensing blocks and the first proof mass comprises:

a comb-like electrode, extended from the first proof mass and having a plurality of comb-like capacitive plates; and a fixed comb-like electrode, extended from one of the fixed sensing blocks and having a plurality of fixed comb-like capacitive plates, wherein the comb-like capacitive plates and the fixed comb-like capacitive plates are disposed in parallel and alternately.

18. The multi-axis capacitive accelerometer according to claim 17, wherein the capacitive structures comprise:
a plurality of first capacitive structures, wherein the comb-like capacitive plates and the fixed comb-like capacitive plates of each first capacitive structure are extended along a first direction parallel to the surface of the substrate for sensing an acceleration in a second direction, and the first direction and the second direction are coplanar and perpendicular to one another; and
a plurality of second capacitive structures, wherein the comb-like capacitive plates and the fixed comb-like capacitive plates of each second capacitive structure are extended along the second direction for sensing an acceleration in the first direction.

19. The multi-axis capacitive accelerometer according to claim 16, wherein the anchor bases comprise a first fixed block and a second fixed block disposed at two opposite sides of the first proof mass.

20. The multi-axis capacitive accelerometer according to claim 19, wherein the first set of elastic linkages comprises a first spring and a second spring respectively corresponding to the first fixed block and the second fixed block, and the first spring and the second spring provide restoring forces in a first direction and a second direction, the first direction and the second direction being coplanar and perpendicular to one another.

21. The multi-axis capacitive accelerometer according to claim 20, wherein the first proof mass is symmetric along the central axis and is connected to the first fixed block and the second fixed block through the first spring and the second spring respectively.

22. The multi-axis capacitive accelerometer according to claim 20, wherein the second set of elastic linkages comprises a third spring and a fourth spring located on the corresponding rotating axis and connected between the first proof mass and the second proof mass.

23. The multi-axis capacitive accelerometer according to claim 22, wherein the third set of elastic linkages comprises a fifth spring and a sixth spring located on the corresponding rotating axis and connected between the first proof mass and the third proof mass.

24. The multi-axis capacitive accelerometer according to claim 16, wherein the first proof mass has a bottom surface facing the substrate and a plurality of bumps on the bottom surface.

25. The multi-axis capacitive accelerometer according to claim 16, wherein the second proof mass and the third proof mass are provided with a plurality of micro-holes for reducing damping effect.

26. The multi-axis capacitive accelerometer according to claim 15, wherein the first proof mass further has a plurality of third openings therein and at least a part of the fixed sensing blocks are located in the third openings.

27. The multi-axis capacitive accelerometer according to claim 26, wherein each capacitive structure formed by the fixed sensing block and the first proof mass comprises:
a comb-like electrode, extended from the first proof mass and having a plurality of comb-like capacitive plates; and
a fixed comb-like electrode, extended from one of the fixed sensing blocks and having a plurality of fixed comb-like capacitive plates, wherein the comb-like capacitive plates and the fixed comb-like capacitive plates are disposed in parallel and alternately.

28. The multi-axis capacitive accelerometer according to claim 27, wherein the capacitive structures comprise:
a plurality of first capacitive structures, wherein the comb-like capacitive plates and the fixed comb-like capacitive plates of each first capacitive structure are extended along a first direction parallel to the surface of the substrate for sensing an acceleration in a second direction, and the first direction and the second direction are coplanar and perpendicular to one another; and
a plurality of second capacitive structures, wherein the comb-like capacitive plates and the fixed comb-like capacitive plates of each second capacitive structure are extended along the second direction for sensing an acceleration in the first direction.

29. The multi-axis capacitive accelerometer according to claim 28, wherein the anchor bases comprise a first fixed block and a second fixed block disposed at two opposite sides of the first proof mass.

30. The multi-axis capacitive accelerometer according to claim 29, wherein the first set of elastic linkages comprises a first spring and a second spring respectively corresponding to the first fixed block and the second fixed block, and the first spring and the second spring provide restoring forces in a first direction and a second direction, the first direction and the second direction being coplanar and perpendicular to one another.

31. The multi-axis capacitive accelerometer according to claim 30, wherein the first proof mass is symmetric along the central axis and is connected to the first fixed block and the second fixed block through the first spring and the second spring respectively.

32. The multi-axis capacitive accelerometer according to claim 30, wherein the second set of elastic linkages comprises a third spring and a fourth spring located on the corresponding rotating axis and connected between the first proof mass and the second proof mass.

33. The multi-axis capacitive accelerometer according to claim 32, wherein the third set of elastic linkages comprises a fifth spring and a sixth spring located on the corresponding rotating axis and connected between the first proof mass and the third proof mass.

34. The multi-axis capacitive accelerometer according to claim 26, wherein the first proof mass has a bottom surface facing the substrate and a plurality of bumps on the bottom surface.

35. The multi-axis capacitive accelerometer according to claim 26, wherein the second proof mass and the third proof mass are provided with a plurality of micro-holes for reducing damping effect.

36. The multi-axis capacitive accelerometer according to claim 15, wherein the first set of elastic linkages, the second set of elastic linkages or the third set of elastic linkages comprises springs.

* * * * *